(12) United States Patent
Mohan et al.

(10) Patent No.: US 8,085,811 B2
(45) Date of Patent: *Dec. 27, 2011

(54) METHOD AND APPARATUS FOR TRANSPORTING ETHERNET SERVICES

(75) Inventors: Dinesh Mohan, Kanata (CA); Hamid Ould Brahim, Kanata (CA)

(73) Assignee: Nortel Networks, Ltd., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/785,527

(22) Filed: May 24, 2010

(65) Prior Publication Data
US 2010/0226376 A1    Sep. 9, 2010

Related U.S. Application Data

(63) Continuation of application No. 11/540,023, filed on Sep. 30, 2006, now Pat. No. 7,746,892.

(60) Provisional application No. 60/732,895, filed on Nov. 2, 2005.

(51) Int. Cl.
*H04J 3/16* (2006.01)
(52) U.S. Cl. ........................................ 370/466
(58) Field of Classification Search .................. 370/466, 370/248, 230, 236, 256, 351, 389–399, 437
See application file for complete search history.

(56) References Cited

U.S. PATENT DOCUMENTS

| | | | |
|---|---|---|---|
| 2003/0142674 A1 | 7/2003 | Casey | |
| 2003/0174706 A1* | 9/2003 | Shankar et al. | 370/393 |
| 2004/0184407 A1* | 9/2004 | Pok et al. | 370/236 |
| 2004/0184408 A1 | 9/2004 | Liu et al. | |
| 2004/0184498 A1* | 9/2004 | Ueki | 372/45 |
| 2005/0018605 A1* | 1/2005 | Foote et al. | 370/230 |
| 2005/0027782 A1 | 2/2005 | Jalan et al. | |

(Continued)

FOREIGN PATENT DOCUMENTS
WO   WO 2004/008696   1/2004

OTHER PUBLICATIONS

V. Radoaca, et al., *GVPLS/LPE—Generic VPLS Solution based on LPE Framework*, Internet Engineering Task Force (IETF) Internet Draft (ID) draft-radoaca-ppvpn-gvpls-01.txt, Oct. 2002.

(Continued)

*Primary Examiner* — Kwang B Yao
*Assistant Examiner* — Jung-Jen Liu
(74) *Attorney, Agent, or Firm* — Anderson Gorecki & Manaras LLP

(57) ABSTRACT

Frames of customer traffic may be encapsulated by adding Mac-in-Mac (MiM) encapsulation fields for transportation of the frames over a portion of provider network. The MiM encapsulated traffic may be further encapsulated using VPLS by adding VPLS encapsulation fields for transportation of the frames over another portion of the provider network. The MiM encapsulations use provider network MAC addresses which enables VPLS MAC learning to occur using provider network MAC address space. MiM tunnels are mapped to VPLS service instances which are assigned pseudowire tags for transportation over the VPLS portion of provider network. The MiM header is retained when the MiM encapsulated frames are transported over the VPLS portion of the provider network. As VPLS frames exit the core network, the VPLS encapsulation fields are removed to extract the original MiM encapsulated frames for further transportation over the MiM portion of the provider network.

16 Claims, 3 Drawing Sheets

U.S. PATENT DOCUMENTS

| | | | |
|---|---|---|---|
| 2006/0002370 A1* | 1/2006 | Rabie et al. | 370/351 |
| 2006/0013142 A1* | 1/2006 | Hongal et al. | 370/248 |
| 2006/0198323 A1* | 9/2006 | Finn | 370/256 |
| 2006/0245438 A1* | 11/2006 | Sajassi et al. | 370/399 |
| 2007/0098006 A1* | 5/2007 | Parry et al. | 370/437 |

OTHER PUBLICATIONS

International Search Report and Written Opinion from Corresponding PCT application PCT/CA2006/001797, dated Feb. 8, 2007.

* cited by examiner

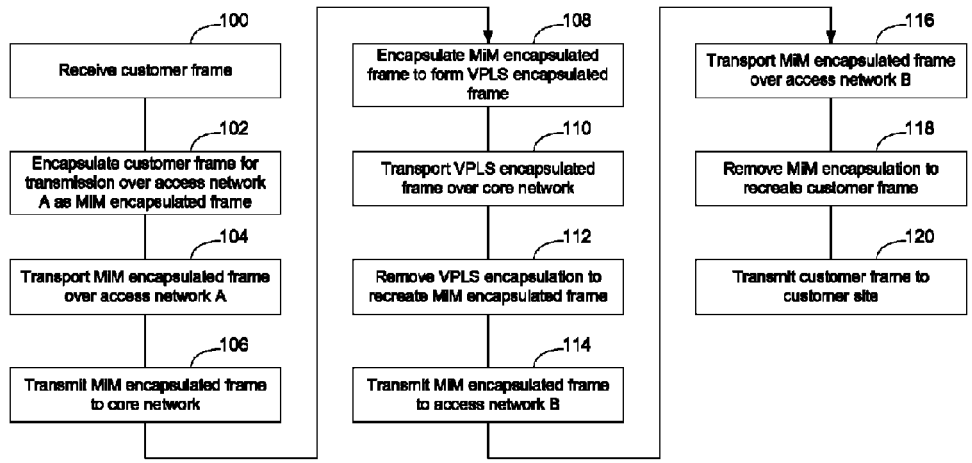
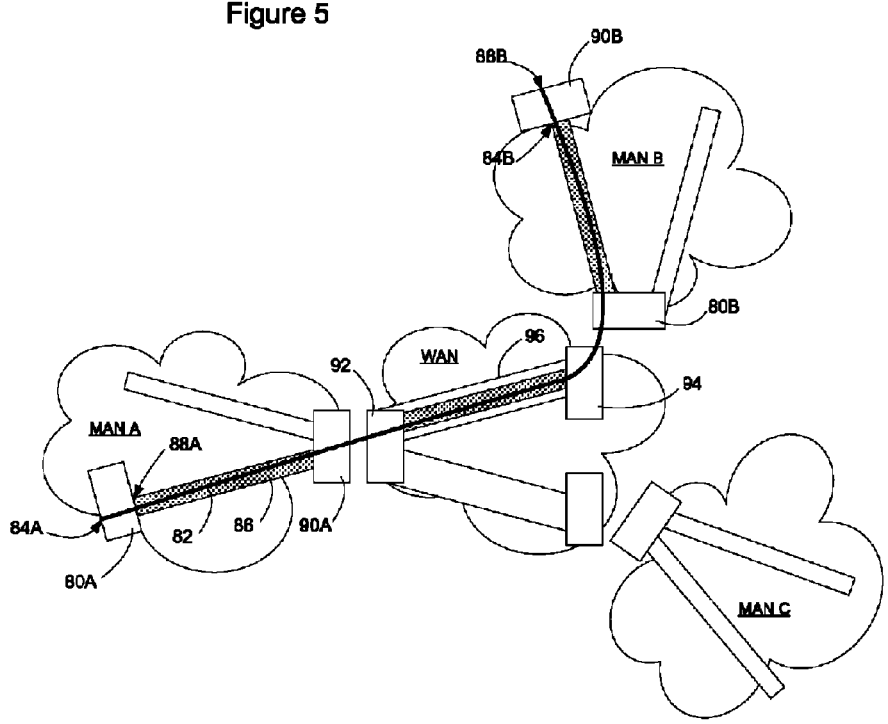

METHOD AND APPARATUS FOR TRANSPORTING ETHERNET SERVICES

CROSS REFERENCE TO RELATED APPLICATIONS

This application is a continuation of U.S. patent application Ser. No. 11/540,023, filed Sep. 30, 2006, now U.S. Pat. No. 7,746,892 and also claims the benefit of and priority from U.S. Provisional Patent Application No. 60/732,895, filed Nov. 2, 2005, entitled "Virtual MiM LAN service", the content of each of which is hereby incorporated herein by reference.

BACKGROUND OF THE INVENTION

1. Field of the Invention

The present invention relates to communication networks and, more particularly, to a method and apparatus for transporting Ethernet services, where the Ethernet service itself might be used to carry other native services.

2. Description of the Related Art

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements.

Large communication networks generally include subscriber networks, provider-based access networks, and core networks. Subscriber networks are commonly referred to as Local Area Networks (LANs), such as may be implemented by a corporation or university, or even in a residence. Access networks are used to aggregate traffic from a large number of subscribers, and generally encompass an area such as a metropolitan area or regional geographic area. Core networks are generally used to transport data between access networks. Access and core networks may exist in many different geographic areas and may be connected in myriad different ways.

Traditionally, Local Area Networks (LANs) have implemented a network protocol such as Ethernet to enable network elements on the LAN communicate with each other. Ethernet is a well known networking protocol that has been defined by the Institute of Electrical and Electronics Engineers (IEEE) 802 Groups. Conventionally, Ethernet has been used to implement networks in enterprises such as businesses and campuses, and other technologies have been used to transport network traffic in the access and core networks. Specifically, network providers such as carriers that sell bandwidth to subscribers on the access and core networks were reluctant to deploy networks based on Ethernet technology, since Ethernet was designed to provide best efforts service and did not support various control and management functions that were deemed necessary by network providers. As the Ethernet specifications have evolved, however, and as advancements have been made to Ethernet technology, some of these issues are being resolved. Consequently, many service providers are starting to use Ethernet to implement portions of their networks networks.

It is not uncommon for networks to be connected to enable packets to flow from a subscriber's LAN over access and core networks (which may be provided by a service provider or another entity), and then back onto a different portion of the subscriber's LAN. To enable this to happen, the particular manner in which the packet is handled may make a large difference as to the amount of coordination required between the various networks.

Networks may be viewed as having three layers—a data layer, a control layer, and a management layer. The data layer is related to how data is actually transmitted on the network. The control layer is related to how the network elements on the network interoperate. The management layer is related to how operation of the network may be monitored so that faults may be detected and corrected in a timely manner.

Depending on who owns which portions of the network, it may be desirable for one or more of the network areas to have shared control or management planes. For example, a network provider may own access networks in multiple cities and may want them to be commonly managed and to share control information. Depending on the particular way in which the networks are connected, it may be necessary for the networks to work together so that control and data may be passed between the networks. This type of interworking may require significant coordination and may be difficult to implement in situations where one service provider does not own all sections of the network.

SUMMARY

Frames of customer traffic may be encapsulated using Mac-in-Mac (MiM) encapsulation and the MiM encapsulated traffic may be further encapsulated using Virtual Private LAN Service (VPLS) encapsulation. The MiM encapsulation uses provider network MAC addressing and include service tags to identify service instances associated with the encapsulated frame. The MiM encapsulated frames are mapped to VPLS service instances and encapsulated using VPLS encapsulation for transportation over the core network. The MiM encapsulation is added when the customer service frames are transported over the MiM network. As frames arrive at the edge of MiM network, the service provider MAC addresses are used as part of the MiM encapsulation. In addition, MiM encapsulation also includes a tag which identifies the MiM tunnel over which various MiM service instances can be carried. This tag is used to identify the correct VPLS service instance and the service provider MAC addresses are used to identify the correct path within the VPLS network. Or in other words, the service provider MAC address space is used for VPLS MAC learning. A pseudowire tag is assigned for each MiM tunnel so that multiple MiM tunnels may use the same VPLS path in the core network. The encapsulation methods described herein may be used to transport Ethernet services, which may be point-to-point, point-to-multipoint, and multipoint, and which may be used to carry frames belonging to other services such as IP frames.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 4 is a flowchart illustrating a process of using MiM and VPLS encapsulation to transport data across a network according to an embodiment of the invention;

FIG. 5 is a functional block diagram graphically illustrating an encapsulation process for a particular service instance.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
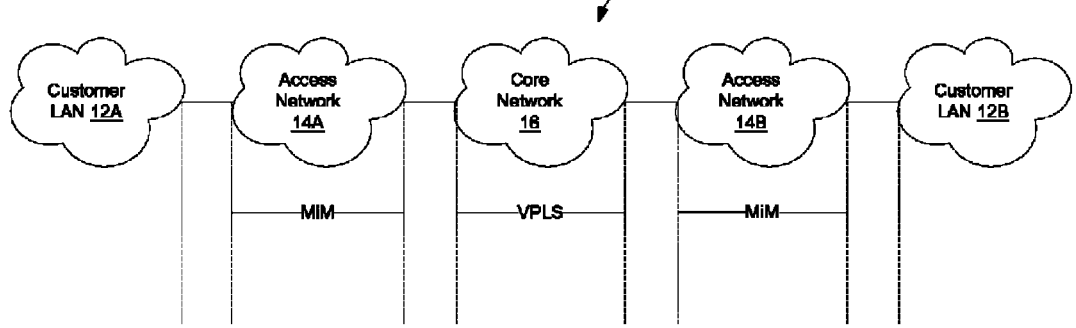
FIG. 1 is a functional block diagram of an example communication network configured to transport data using MiM and VPLS encapsulations according to an embodiment of the invention.

FIG. 1 illustrates an example network 10 in which customer traffic from a customer LAN 12A may be transported across an access network 14A, a core network 16, back through a second access network 14B, and then to another customer network 12B. As discussed in greater detail below, the Ethernet services from the customer network may be encapsulated using Mac-in-Mac (MiM) encapsulation in the access networks 14A, 14B. This MiM encapsulation may be carried out using the procedures set forth in IEEE 802.1ah draft standard, although other encapsulation processes may be used as well. For example, as changes are made to the draft standard, the changes may be implemented to cause the encapsulation process to continue to comply with the standard. The MiM encapsulated traffic may be further encapsulated using Virtual Private LAN Service (VPLS) encapsulation in the core network. The particular way in which MiM encapsulation and VPLS encapsulation is implemented (as discussed in greater detail below) enables the data planes, control planes, and management planes of the access and core networks to be independent so that interworking of these planes is minimized.

Figure 2:
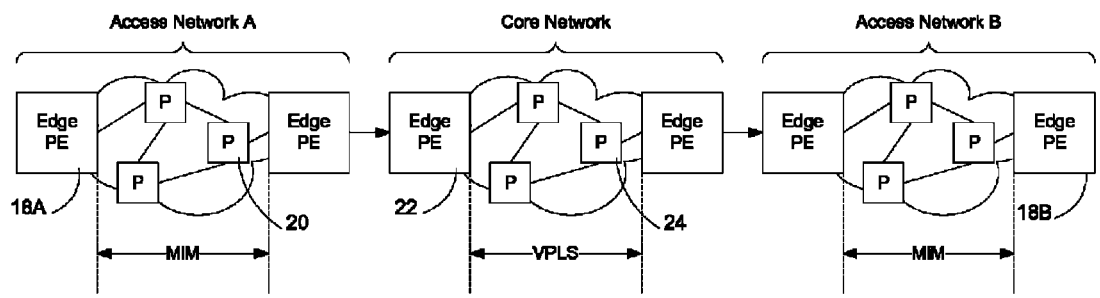
FIG. 2 is a functional block diagram of a portion of the example communication network of FIG. 1 showing portions of the networks in greater detail according to an embodiment of the invention.

FIG. 2 illustrates a portion of the network of FIG. 1 in greater detail. As shown in FIG. 2, each network area (e.g. each access and core network) has Provider Edge (PE) network elements 18 configured to interconnect the area of the network with another network or customer. The network areas also have network elements that only are connected to other network elements within the network area. These network elements are referred to herein as P network elements 20.

A provider may set up a MiM tunnel between a first edge PE 18A on access network A to a second Edge PE on access network B 18B. Since there may be many edge PEs on the access networks, many MiM tunnels may be established. Once these MiM tunnels are established, customer traffic associated with customer service instances may be mapped to the MiM service instances. This may be accomplished by selecting an I-SID value for the service instance via end-to-end control plane between the access networks without input from the core network. These MiM service instances are then mapped to MiM tunnels. This may be accomplished by selecting a tag for the tunnel, again via end-to-end control plane between the access networks without input from the core network, or by selecting pre-established MiM tunnels.

The MiM tunnels need to be mapped to VPLS service instances over the core network. The core network has a number of edge PEs 22. The core network may establish paths (e.g. MPLS Label Switched Paths or other types of paths) through the core network via P network elements 24 that may be used to carry traffic belonging to VPLS service instances through the core network. These paths through the core network may be used by many different VPLS service instances, and traffic belonging to different VPLS service instance may be differentiated using tags (e.g. pseudo wire tags) as discussed in greater detail below.

In operation, customer traffic will be carried on a particular service instance that is negotiated end-to-end by the access networks. The service instance will be assigned to a particular MiM service instance which is mapped to a specific MiM tunnel through the access network A. The MiM encapsulation uses source and destination MAC addresses which are MAC addresses in the access networks A and B. Multiple services instances identified by I-SID may be carried on a given MiM tunnel.

The core edge PE 22 will perform MAC address learning on its ingress PE by looking at the MAC addresses of the MiM encapsulated frame. The core network will determine which VPLS service instance should be used to carry the traffic for the MiM tunnel and assign a tag to the MiM tunnel so that multiple MiM tunnels may be multiplexed across a given VPLS path between core edge PEs 22. When traffic is received at the core network ingress, the traffic will be encapsulated by applying the tag to identify the VPLS instance and another tag to identify the VPLS path. In this manner the MiM traffic from the access network may be carried transparently across the core network.

Figure 3:
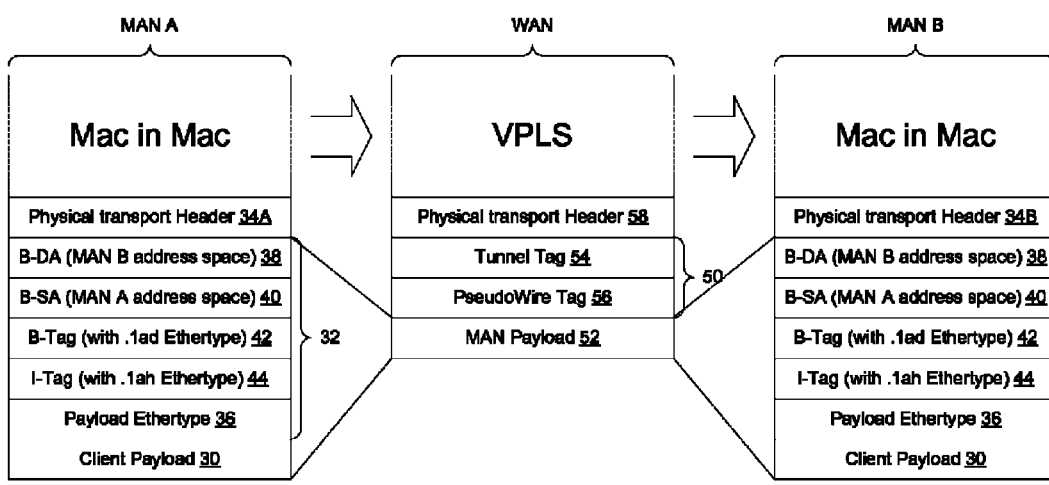
FIG. 3 is a functional block diagram of the encapsulation used in each part of the communication network of FIG. 1 according to an embodiment of the invention.

FIG. 3 illustrates the format of the headers that may be used to perform MiM and VPLS encapsulation as described herein. As shown in FIG. 3, client frames are carried without modification as the client payload 30 of a Mac-in-Mac encapsulated frame. Mac-in-Mac encapsulation is being defined in IEEE draft 802.1ah, the content of which is hereby incorporated herein by reference. As mentioned above, other encapsulation processes may be used as well, for example as the 802.1ah draft standard continues to evolve.

As shown in FIG. 3, the MiM encapsulation causes a MiM encapsulation fields 32 to be applied to the client payload 30 so that the access network is able to use its own MAC address space to forward traffic across the access network. A physical transport header 34 may also be applied to enable the traffic to be handled by the network. The format of the physical transport header 34 will depend on the particular technology that has been deployed in the access network. For example, the physical transport header 34 may be a SONET header, a Generic Framing Procedure (GFP) header, or another type of header.

The MiM encapsulation fields 32 include the source and destination MAC addresses which are the end-points within the MiM tunnel. The Destination MAC Address (B-DA) 38 is the MAC address in access network B which is the destination address of the MiM tunnel end-point. B-DA is based on the access network MAC address space and may be, for example, the MAC address of the ingress port of the egress PE in access network B. Since the MiM encapsulated frames are addressed in a manner that does not rely on the customer MAC address space, the customer's MAC address space is hidden from both the access network and the core network so it is not necessary to ensure that the customers use globally unique MAC addresses.

The Source MAC Address (B-SA) 40 is the source address of the MiM tunnel end-point. B-SA is based on the source MAC address in access network A where the MiM tunnel originates. For example, this may be the MAC address of the egress port of the ingress PE in access network A.

A given MiM tunnel will extend between one or more pairs of SA/DA MAC addresses. Since many subscribers may need to send traffic between those endpoints, it would be good to enable the traffic to be multiplexed onto the MiM tunnels. To do this, service instances are used. A given MiM tunnel may carry multiple MiM service instances. The MiM service instances may be distinguished on the MiM tunnels using the I-Tag 44. The I-Tag includes the 802.1ah Ethertype value. A B-Tag (802.1ad Ethertype) is included to limit the broadcast domain for MiM tunnels. The MiM encapsulation fields 32 may also include a payload Ethertype field 36 indicating the particular Ethertype of the client payload.

The portions of the MiM encapsulation fields may be used as follows. Initially, the access network provider may establish tunnels between end points on the access network. These are the MiM tunnels. MiM service instances will be mapped to the MiM tunnels and client traffic will be mapped to the MiM service instances. Traffic belonging to different MiM service instances may be identified by the I-Tag values so that the traffic may be separated at within the MiM tunnels.

When a client frame is received at an ingress PE, the ingress PE may use the client frame's VLAN ID to set the I-Tag which contains the I-SID. The ingress PE may determine which MiM tunnel should be used to carry the frame and set the set the B-SA, B-DA and B-VID fields so that the MiM encapsulation fields include the correct MAC addresses for the MiM tunnel. The physical transport header may then be applied and the packet will be transported across the access network.

When the frame arrives at a core network ingress PE, the access network payload, including the client payload 30 and the MiM encapsulation fields, may be encapsulated by applying a VPLS encapsulation fields 50 to the frame. The VPLS payload in the core network 52 is the entire MIM encapsulated frame, including the MIM encapsulation fields and the client payload. The physical header 34 will be stripped from the MiM frame before VPLS encapsulation.

The core network ingress PE maps MiM frames to particular VPLS service instances. Each VPLS service instance extends between a particular pair of ingress and egress PE network elements on the core network and will extend along a path through the network between those PE network elements. Depending on the number of PE network elements on the core network there may therefore be many service instances.

The ingress PE on the core network performs mapping of MiM tunnels, identified by the MiM tunnel tag, to VPLS service instance and MAC learning for MiM tunnels to learn the VPLS path that is to be used to carry MiM encapsulated traffic from each of the MiM tunnels that send traffic to the ingress PE. Since the MiM encapsulated frames contains MAC addresses that have been assigned by access network A and access network B, the MAC learning in VPLS is based on access network MAC address space. The MAC address space associated with the access networks is more likely to be stable, compared to customer MAC address space, and thus MAC learning of provider MAC addresses may be expected to be more robust than if customer address space was used. VPLS is defined by the IETF L2VPN working group, and is intended to be compliant with standards proposed by that working group.

The core network will also assign a physical transport header 58 to the frame to enable the core network to transport the frame across the network. The format of the physical transport header 58 in the core network, like the physical transport header 34 in the access network, will depend on the technology being used to implement the core network.

At the core network egress PE, the pseudowire tag 56 is used by the egress PE to route the frame to the correct egress port/interface. The VPLS header 50 and core network physical header 58 will be removed at the core network egress PE so that the MiM frames that were transported as the access network payload 52 may be transmitted to the ingress PE on access network B.

Since the MiM header was transported transparently across the core network, the frame may be forwarded by the ingress PE on access network B to the intended egress PE on access network B as defined by the access network B destination address B-DA 38. A new physical transport header will be added at the ingress PE on access network B, the format of which will depend on the particular technology used to implement the access network B.

When the frame arrives at the egress PE on access network B, the egress PE on access network B will use the I-SID in the I-TAG to identify the VLAN associated with the frame. This value may be used to forward the frame to the correct customer LAN without requiring the egress PE to perform an inspection of customer frame header. The MiM header 32 and physical transport header 34B will be removed before the frame is forwarded to the customer LAN.

Since the frame that was received from the customer LAN by access network A was directly carried as the client payload, the frame that is received by the customer LAN will contain all of the original header information, etc. that was included with the frame when it was received at access network A. Thus, transportation of the client frames over the access and core networks may be transparent to the client. Similarly, the MiM frame output from the core network is the same as the MiM frame that was input to the core network, which makes transportation of the frames over the core network transparent to the access networks.

From a control plane perspective, the core network will treat all frames received from the access network as ordinary data frames. Thus, control frames that are being used to exchange control information in the access network will be transported transparently across the core network. This enables the control planes for the access network to be end-to-end. Stated differently, access network A and access network B may share a common control plane. The control plane may be anything, for example Multiple Registration Protocol (MRP), Generalized MPLS (GMPLS), provisioned, and the invention is not limited to the particular control plane selected to implement the access network control plane.

Since the access network control plane frames are transported transparently across the core network, and are not processed or used by the core network, the core network may maintain its own control plane independently. Thus, interworking between the access network and core network at the control level is not required. Although the access network and core network may exchange control information with each other if desired, in ordinary operation the core network may transport control packets just like any other data packets and may not treat the access network control packets in a special manner.

Network management may be used to monitor network conditions to identify network problems and optionally to isolate the location of network problems once they occur. One way to do this is to inject Operation, Administration and Maintenance (OAM) frames at selected points in the network and then look for the OAM frames at another point or points in the network. Monitoring OAM flows may enable parts of the network to be monitored for faults, and for faults to detected and isolated.

Since the core network will transparently transport any frame it receives from the access network, access network OAM flows may exist between the access networks. Stated another way, the core network treats the end-to-end access network OAM frames as regular data packets and thus, the core network treatment of OAM frames is no different than the data plane frames. The transparent transmission of OAM frames across the core network enables a common management plane to be used for access network A and access network B, so that management flows may exist end-to-end within the access network. Similarly, management entities may be defined within each of access network A and access network B, so that the access networks may independently be managed. The core network may also implement its own management plane without requiring the core network management plane to be interworked with the access network management plane(s).

Where the core network and access network are owned by the same service provider, it may be desirable to interwork the management planes of these two networks, for example by defining management flows that span across boundaries between the network areas. The invention is not limited to an embodiment in which there is no interworking between the core and access networks. Rather, as noted above, the solution described herein enables the two networks to be independently managed if desired, so that interworking between the core and access networks is not a prerequisite to management of any one of them. Ethernet OAM flows may be used to perform network management as described in greater detail in co-pending U.S. patent application Ser. No. 10/880,876, entitled "Ethernet OAM Domains and Ethernet OAM Frame Format", the content of which is hereby incorporated herein by reference. Ethernet OAM flows are also defined in ITU standard Y.1731, the content of which is hereby incorporated herein by reference.

FIG. 4 illustrates a process of transporting a customer frame across a communication network in which MiM encapsulation is used in the access network and VPLS encapsulation is used in the core network. FIG. 5 illustrates graphically the encapsulation process for a particular service instance.

When a service frame is received at the access network ingress PE (100) the ingress PE 80A will look at the provider VLAN ID (also referred to as the S-VID contained in the S-TAG) associated with the frame and use the provider VLAN ID to identify a MiM service instance 82 for that frame. The MiM service instance (reference 82 in FIG. 5) is a construct in the access network which extends end-to-end across the access network so that the access network may maintain VLAN traffic isolated to enable it to provide VPN service to its customers. The MiM service instance is identified by the I-Tag 44 and may extend, for example, between the input port 84A on the access network ingress PE 80A and the output port 88B on the access network egress PE 90B The MiM service instance will be carried in a MiM tunnel defined between end points (B-SA 40 and B-DA 38) in the access network. Unlike the MiM service instance, the MiM tunnel may extend between the output port 88A on the access network ingress PE 80A and the input port 84B on the access network egress PE 90B. Since the MiM service instances extend from the input ports 84A of the access network input PE 80A rather than the output port 88A of the access network input PE 80A, many MiM service instances may be carried on one MiM tunnel. As described above, the I-TAG 44 is included in the MiM header (see FIG. 3) so that the access network egress PE may identify the service instance associated with the frame without looking at the client payload.

When the frame is received (100) the customer frame will be encapsulated for transmission over the access network as a MiM encapsulated frame (102). The encapsulated frame will then be transported over the MiM tunnel from the access network A ingress PE 80A to the access network A egress PE 90A (104). The access network A egress PE will then transmit the MiM encapsulated frame to the core network ingress PE 92 (106).

The core network ingress PE 92 will use the entire MiM encapsulated frame as a payload in a VPLS encapsulated frame. Specifically, the core network ingress PE 92 will remove the physical transport header from the frame and encapsulate the MiM encapsulated frame to form a VPLS encapsulated frame. The core network ingress PE 92 will use the B-TAG 38 to determine which VPLS service instance, represented by the pseudowire tag 56, should be used to carry the frame and select the appropriate VPLS tunnel tag 54 based on B-DA.

Once the frame has been encapsulated, the VPLS encapsulated frame will be transported over the core network (110) to the core network egress PE 94. The core network egress PE 94 will remove the VPLS encapsulation fields to extract the MiM encapsulated frame. The core network egress PE 94 will use the pseudowire tag 56 to identify the interface for the MiM tunnel and forward the frame out over a port associated with the MiM tunnel to the access network B (114).

The access network ingress PE 80B will receive the MiM encapsulated frame and transport the MiM encapsulated frame over the access network B (116). Since the MiM encapsulation has been transported over the core network without modification, it is only necessary to attach the appropriate physical header for access network B before forwarding the MiM encapsulated frame on the access network B.

When the MiM encapsulated frame arrives at the access network B egress PE 90B, it will be unencapsulated. Specifically, the access network B egress PE 90B will remove the MiM encapsulation to recreate the customer frame (118). The I-SID contained in the I-Tag may then be used to identify the correct VLAN and port over which the customer frame should be forwarded (120) without requiring the egress PE to perform a lookup on the header of the customer frame to identify the VLAN ID of the customer frame.

Figure 6:
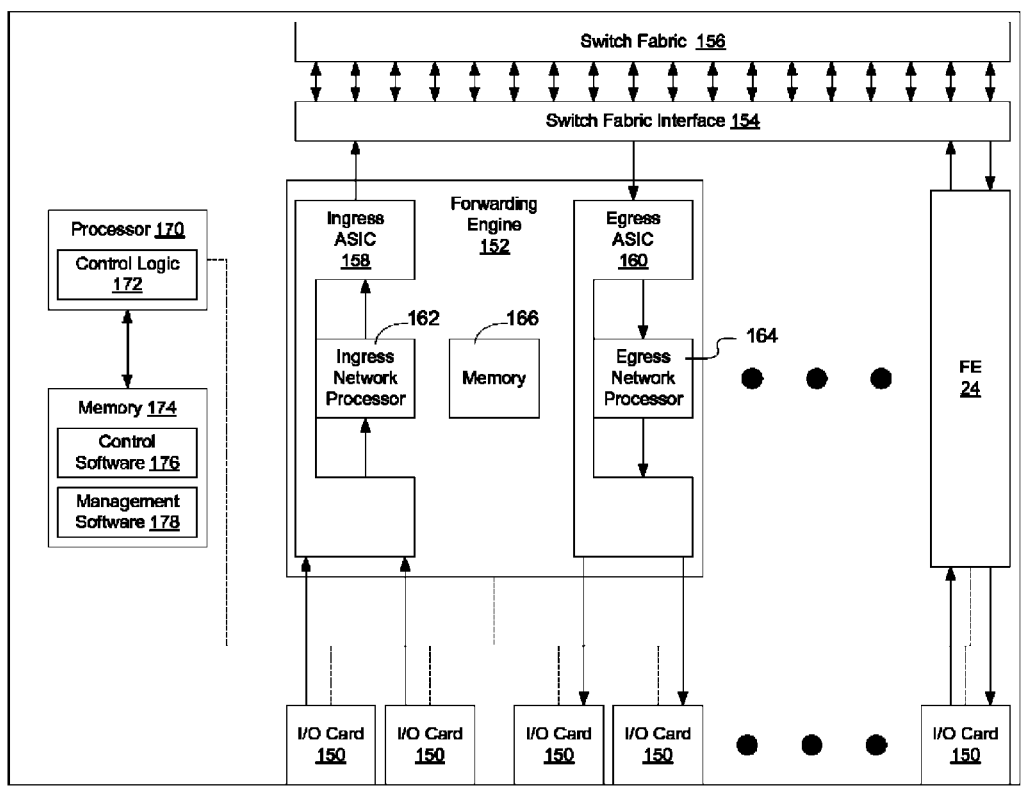
FIG. 6 is a functional block diagram of a network element that may be used to perform encapsulation/decapsulation according to an embodiment of the invention.

FIG. 6 illustrates one embodiment of a network element that may be configured to implement an embodiment of the invention. The network element may be used to implement one of the PE network elements 80A, 80B, 90A, 90B, 92, and/or 94 of FIG. 5. The invention is not limited to a network element configured as illustrated, however, as the invention may be implemented on a network element configured in many different ways. The discussion of the specific structure and methods of operation of the embodiment illustrated in FIG. 5 is intended only to provide one example of how the invention may be used and implemented in a particular instance. The invention more broadly may be used in connection with any network element configured to handle Ethernet frames and other types of protocol data units in a communications network.

As shown in FIG. 6, the network element generally includes Input/Output (I/O) cards 150 configured to connect to links in the communications network. The I/O cards 150 may include physical interfaces, such as optical ports, electrical ports, wireless ports, infrared ports, or ports configured to communicate with other conventional physical media, as well as configurable logical elements capable of operating as MAC (layer 2) ports.

One or more forwarding engines 152 are provided in the network element to process frames received over the I/O cards 150. The forwarding engines 152 forward frames to a switch fabric interface 154, which passes the packets to a switch fabric 156. The switch fabric 156 enables a frame entering on a port on one or more I/O cards 150 to be output at one or more different ports in a conventional manner. A frame returning from the switch fabric 156 is received by one of the forwarding engines 152 and passed to one or more I/O cards 50. The frame may be handled by the same forwarding engine 152 on both the ingress and egress paths. Optionally, where more than one forwarding engine 152 is included in the network element, a given frame may be handled by different forwarding engines on the ingress and egress paths.

The invention is not limited to any particular forwarding engine 152, switch fabric interface 154, or switch fabric 156, but rather may be implemented in any suitable network element configured to handle Ethernet frames and/or other protocol data units on a network. One or more Application Specific Integrated Circuits (ASICs) 158, 160 and processors 162, 164 may be provided to implement instructions and processes on the forwarding engines 152. Optionally, a memory 166 may be included to store data and instructions for use by the forwarding engines.

The I/O cards 150, forwarding engine 152, switch fabric interface 154 and switch fabric 156, form a data plane for the network element. One or more of the components in the data plane is configured, according to an embodiment of the invention, to handle the Ethernet frames by adding or removing the MiM encapsulation fields 32, access network physical transport headers 34A, 34B, VPLS encapsulation fields 40, and/or core network physical transport headers 58, as discussed above. The particular headers to be added will depend on whether the network element is being used as an access network PE 18, or as a core network PE 22.

The network element also has a control plane configured to exchange control packets with other network elements so that the correct encapsulation fields may be applied to frames as they are received. To do this, the control plane includes at least one processor 170 containing control logic 172. The processor may interface a memory 174 to retrieve data and instructions that will enable the control logic to execute control software 176 configured to enable the network element to perform control functions on the network. The memory may also include management software 178 configured to enable the network element to participate in OAM management flows on the network as discussed in greater detail above. Actions to be taken by the data plane may be programmed into the data plane by the control plane so that the data plane may operate on frames in the manner described above.

It should be understood that all functional statements made herein describing the functions to be performed by the methods of the invention may be performed by software programs implemented utilizing subroutines and other programming techniques known to those of ordinary skill in the art. When the functions described herein are implemented in software, the software may be implemented as a set of program instructions configured to operate in control logic on a network element that are stored in a computer readable memory within the network element and executed on a microprocessor.

Alternatively, all or some of the functions described herein be implemented in hardware, firmware, or a combination of hardware, software, and firmware. For example, it will be apparent to a skilled artisan that all or many of the functions described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention and the invention is not limited to a particular implementation.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. An edge device for interfacing a Multi-Protocol Label Switching (MPLS) network to MAC-in-MAC (MiM) network, comprising:
   an input port operable to receive a MiM-encapsulated client frame, the MiM encapsulated client frame including a client payload field containing the client frame, a destination MAC address field, a source MAC address field, a B-Tag field, and an I-Tag field;
   a processor operable to determine a Virtual Private LAN Service (VPLS) service instance on the MPLS network based on the B-Tag field of the MiM-encapsulated client frame, the B-Tag field of the MiM encapsulated client frame being used to identify a MiM tunnel on the MiM network; and
   an encapsulator operable to encapsulate the MiM-encapsulated client frame with VPLS encapsulation fields corresponding to the VPLS service instance to provide a VPLS-encapsulated frame for transportation on the MPLS network.

2. An edge device as defined in claim 1, wherein the processor is operable to perform VPLS MAC learning based on contents of MAC address fields of MiM-encapsulated frames.

3. An edge device as defined in claim 1, wherein the encapsulator is operable to add a tag corresponding to a VPLS service instance and a tag corresponding to the VPLS path to the MiM-encapsulated client frame.

4. An edge device as defined in claim 3, wherein the tag corresponding to the VPLS path corresponds to the destination MAC address of the MiM-encapsulated frame.

5. An edge device as defined in claim 3, wherein the tag corresponding to a VPLS service instance identifies a tunnel.

6. An edge device as defined in claim 1, wherein the client frame is an Ethernet frame comprising an Ethernet header and client data.

7. An edge device as defined in claim 1, further comprising:
an input port operable to receive a VPLS-encapsulated frame; and
a decapsulator operable to remove VPLS encapsulation fields of the VPLS-encapsulated frame.

8. An edge device as defined in claim 1, further comprising:
an input port operable to receive a VPLS-encapsulated frame from the MPLS network; and
a decapsulator operable to remove VPLS encapsulation fields of the VPLS-encapsulated frame to provide an MiM-encapsulated frame to the MiM network.

9. A method of interfacing a Virtual Private LAN Service (VPLS) network to MAC-in-MAC (MiM) network, the method comprising the steps of:
receiving a MiM-encapsulated client frame;
determining a VPLS service instance on the VPLS network based on at least one field of the MiM-encapsulated client frame; and
encapsulating the MiM-encapsulated client frame with VPLS encapsulation fields corresponding to the VPLS service instance to provide a VPLS-encapsulated frame
wherein the MiM encapsulation fields comprise a source address field, a destination address field, an I-tag field, and a B-tag field; and
wherein the VPLS encapsulation fields include a tunnel tag and a pseudowire tag, a value of the tunnel tag being dependent on a value of the destination address field, and a value of the pseudowire tag being dependent on a value of the B-tag field.

10. A method as defined in claim 9, further comprising the step of performing VPLS MAC learning based on contents of MAC address fields of MiM-encapsulated frames.

11. A method as defined in claim 9, further comprising the step of adding a pseudowire tag corresponding to a VPLS service instance and a tunnel tag corresponding to a VPLS path to the MiM-encapsulated client frame.

12. A method as defined in claim 11, wherein the tunnel tag corresponds to the destination MAC address of the MiM-encapsulated frame.

13. A method as defined in claim 11, wherein the pseudowire tag corresponds to a MiM tunnel.

14. A method as defined in claim 9, wherein the client frame is an Ethernet frame comprising an Ethernet header and client data.

15. A method as defined in claim 9, further comprising the steps of:
receiving a VPLS-encapsulated frame; and
removing VPLS encapsulation fields of the VPLS-encapsulated frame.

16. A method as defined in claim 9, further comprising the step of:
receiving a VPLS-encapsulated frame from the VPLS network; and
removing VPLS encapsulation fields of the VPLS-encapsulated frame to provide an MiM-encapsulated frame to the MiM network.

\* \* \* \* \*